Apr. 17, 1923.
W. G. HOUSKEEPER
PRESSURE GAUGE
Filed Nov. 14, 1919
1,452,274
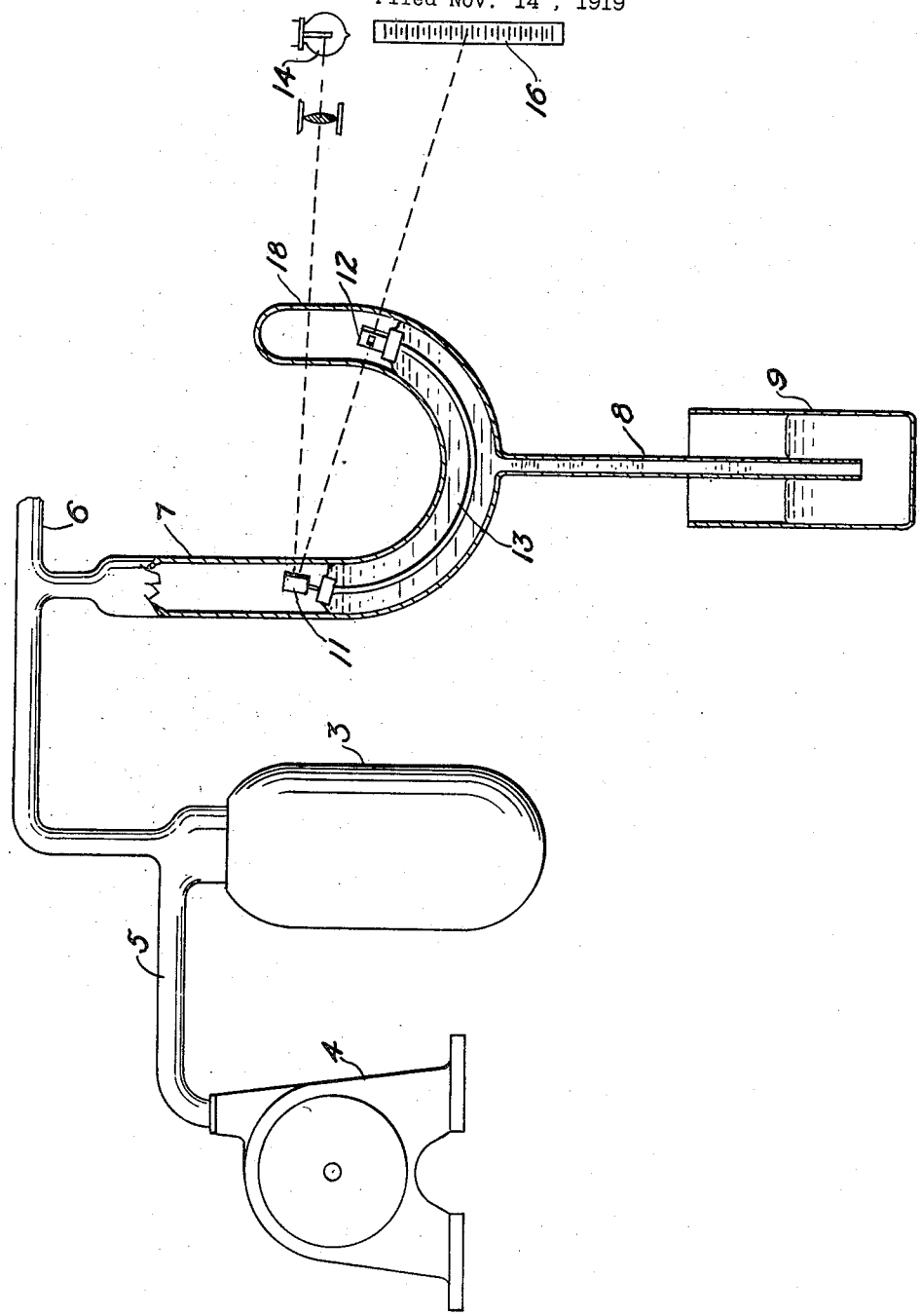
Inventor
William G. Houskeeper
by J. G. Roberts Atty.

Patented Apr. 17, 1923.

1,452,274

UNITED STATES PATENT OFFICE.

WILLIAM G. HOUSKEEPER, OF NEW YORK, N. Y., ASSIGNOR TO WESTERN ELECTRIC COMPANY, INCORPORATED, OF NEW YORK, N. Y., A CORPORATION OF NEW YORK.

PRESSURE GAUGE.

Application filed November 14, 1919. Serial No. 338,071.

*To all whom it may concern:*

Be it known that I, WILLIAM G. HOUSKEEPER, a citizen of the United States, residing at 111 West 11th Street, New York city, in the county of New York, State of New York, have invented certain new and useful Improvements in Pressure Gauges, of which the following is a full, clear, concise, and exact description.

This invention relates to pressure gauges, and more particularly it relates to means for detecting minute variations of pressure.

In the process of evacuating apparatus such as bulbs containing one or more electrodes, it is frequently desirable to detect and measure minute variations in the pressure of the apparatus. An object of this invention is to provide a gauge that will give a continuous indication of the pressure and which will function independently of such external conditions as temperature and barometer height, other objects will be apparent from the detailed description of the invention.

The pressure gauge of this invention makes use of the principle of the optical lever in magnifying the difference in level between two mercury columns. In the preferred form, the gauge comprises a U shaped tube which is connected to the system under evacuation. Attached to the bottom of the U tube is a tube which dips into a mercury reservoir in such a manner that the mercury level in the two arms may be readily adjusted.

The optical lever system comprises a float in each arm of the U tube, the two floats being joined by a suitable rigid connection. A mirror is located on one float and an apertured body is located on the other, it therefore follows that a beam of light which is caused to be reflected from the mirror through the aperture to a suitable scale will serve to indicate any variation in the respective heights of the mercury in the two arms of the U tube.

This invention will be better understood by reference to the following detailed description taken in connection with the accompanying drawing which represents one embodiment of this invention.

Referring to the drawing, 3 represents such apparatus as a glass bulb which is to be evacuated by means of a pump 4 which is connected to the bulb by a tube 5. A McLeod gauge or other suitable measuring device may be connected to the system under evacuation, say at the end of tube 6 so that at any time during the evacuation the absolute value of the pressure may be measured. During the pumping-out process, especially near its completion it is frequently desirable to be able to readily detect small variations in the value of the pressure of the apparatus under evacuation. For example in the manufacture of vacuum tubes containing a plurality of electrodes, after a low pressure has been obtained in the tube, it is customary to subject some of the electrodes to an electron bombardment in order to drive off residual gases. In accordance with this invention, these small variations in pressure may be readily detected and measured by connecting a U shaped tube 7 to the system under evacuation. Attached to the bottom of the U shaped tube 7 is a tube 8 which projects into a mercury reservoir 9. Attached to a float in one arm of the U tube is a mirror 11 attached to a second float in the other arm of the U tube is an apertured body 12. The mirror 11 and the apertured body 12 are joined by a rigid connection 13. 14 is a source of light which is directed on mirror 11 so that the beam of light reflected from the mirror passes through apertured body 12 to a scale 16.

The operation of the system may now be observed. The reservoir 9 is lowered until the level of the mercury in the U tube is low enough to allow the upper part of arm 18 to be at the same pressure as the other arm of the U tube. The evacuated system is then reduced to the pressure, variations from which are to be indicated. After the desired pressure is reached reservoir 9 is raised until arm 18 is cut off from the remainder of the system by the mercury rising in both arms of the U tube. Arm 18 therefore has in it the standard pressure, variations from which are to be measured by the device. It is evident that variations in the pressure of the evacuated system 3 will produce variations in the level of the mercury in the two arms of the U tube and will consequently change the inclination of mirror 11 thereby producing a change in the reading on the scale 16.

In order to make inappreciable the source of error in measurement due to the adhesion of the mercury to the walls of the U tube, a large mercury surface should be employed. For example it has been found quite satisfactory to employ U tubes of from two to four inches in diameter.

In order to insure that the change in the position of mirror 11 due to the rise or fall of the mercury does not carry the mirror outside the range of the beam of light from source 14, the mirror should be large enough and the beam incident upon the mirror should be broad enough to prevent such a possibility.

The difference between the relative levels of the fluid in the arms of the tube has been somewhat exaggerated in order to show more clearly the operation of the device. In actual use the difference between the levels of the liquid in the two arms will be scarcely appreciable to the eye and the path of the reflected beam will, of course, be much nearer to the path of the incident beam.

It is to be understood that this invention may be variously modified without departing in any wise from the spirit of this invention as defined in the appended claims.

What is claimed is:

1. A pressure gauge comprising a transparent tube having a plurality of arms adapted to be partially filled with a sealing fluid, one of said arms being connected to the apparatus to be evacuated, means provided with a reflector and floating on the fluid in both arms and means for indicating the deviations in the path of a beam of light from said reflector.

2. A pressure gauge comprising a transparent tube having a plurality of arms partially filled with a sealing fluid, one of said arms being connected to an apparatus to be evacuated, a reflector floating on the fluid in one of said arms, means for varying the inclination of said reflector upon change of level of the fluid in said arm, means to project light on said reflector, and means to indicate deviation in the path of a beam of light reflected from said reflector.

3. A pressure gauge comprising a transparent tube having arms partially filled with a sealing fluid, one of said arms being connected to an apparatus to be evacuated, a reflector floating on the fluid in one of said arms, means to vary the inclination of the mirror upon change of level of the fluid in said arm, and means including a source of light and a scale for indicating variation in the inclination of said reflector.

4. A pressure gauge comprising a transparent tube having a plurality of arms adapted to be sealed from each other by a sealing fluid, one of said arms being connected to the apparatus to be evacuated, mirror floating on said fluid in one of said arms and apertured body floating on said fluid in another of said arms, said mirror and said body being operatively associated to effect a change in inclination of the mirror upon relative change of the levels of the fluid in said arms, means to project light upon said mirror, and an indicator adapted to receive a beam of light reflected from said mirror through said aperture.

5. A pressure gauge comprising a U shaped transparent tube, one end of said tube being closed, the other end of said tube being connected to the system under evacuation, both arms of said U tube being partially filled at times with mercury, a reflector in one arm of said tube, the position of which is determined by the height of mercury in said arm, an apertured body in the other arm of said tube the position of which is determined by the height of the mercury in said other arm, said reflector and apertured body being operatively associated to effect a change in inclination of the reflector upon relative change of the levels of the fluid in said arms, means to project light upon said reflector and an indicator adapted to receive a beam of light reflected from said reflector through said aperture.

6. A pressure gauge comprising a U shaped transparent tube having its two arms partially filled at times with mercury, the end of one of said arms being closed, the other of said arms being connected to the system being evacuated, a mirror floating on the mercury in one of said arms, an apertured body floating on the mercury in the other of said arms, said mirror and apertured body being operatively associated to effect a change in inclination of the mirror upon relative change of level of the fluid in said arms, a source of light, and a scale adapted to receive through said apertured body a beam of light from said source which has been reflected by said mirror.

7. A pressure gauge comprising a U shaped transparent tube having its two arms partially filled at times with mercury, the end of one of said arms being closed, the other of said arms being connected to the system being evacuated, a mirror floating on the mercury in one of said arms, an apertured body floating on the mercury in the other of said arms, a rigid connection between said mirror and said apertured body, a source of light, and a scale adapted to receive through said apertured body a beam of light from said source which has been reflected by said mirror.

8. A pressure gauge comprising a transparent tube having arms partially filled with a sealing fluid, one of said arms being connected to an apparatus to be evacuated, a mirror floating on the fluid of one of said arms, means to vary the inclination of the mirror upon change of the level of the fluid in said arm, a source of light, an apertured body operatively associated with said mirror to receive light reflected therefrom and means for indicating deviation in the path of a beam of light passing through said aperture.

In witness whereof, I hereunto subscribe my name this 6th day of November A. D., 1919.

WILLIAM G. HOUSKEEPER.